(12) United States Patent
Tyni et al.

(10) Patent No.: US 10,188,994 B2
(45) Date of Patent: Jan. 29, 2019

(54) METHOD, APPARATUS AND SYSTEM FOR AFTERTREATMENT OF EXHAUST GAS

(71) Applicant: Proventia Oy, Oulunsalo (FI)

(72) Inventors: Tuomas Tyni, Liminka (FI); Jukka Kurikka, Liminka (FI)

(73) Assignee: PROVENTIA OY, Oulunsalo (FI)

( * ) Notice: Subject to any disclaimer, the term of this patent is extended or adjusted under 35 U.S.C. 154(b) by 353 days.

(21) Appl. No.: 14/910,820

(22) PCT Filed: Jan. 23, 2014

(86) PCT No.: PCT/FI2014/050052
§ 371 (c)(1),
(2) Date: Feb. 8, 2016

(87) PCT Pub. No.: WO2015/018971
PCT Pub. Date: Feb. 12, 2015

(65) Prior Publication Data
US 2016/0184783 A1 Jun. 30, 2016

(30) Foreign Application Priority Data
Aug. 9, 2013 (FI) ...................................... 20135825

(51) Int. Cl.
*F01N 3/28* (2006.01)
*B01F 5/06* (2006.01)
(Continued)

(52) U.S. Cl.
CPC ............ *B01F 5/0602* (2013.01); *B01D 53/94* (2013.01); *B01D 53/9477* (2013.01);
(Continued)

(58) Field of Classification Search
CPC ............ F01N 2240/20; F01N 2470/24; F01N 3/2892; B01D 53/94; B01F 5/0602
(Continued)

(56) References Cited

U.S. PATENT DOCUMENTS 3,644,098 A * 2/1972 De Palma ............. F01N 3/2846
213/5
6,444,177 B1 9/2002 Müller et al.
(Continued)

FOREIGN PATENT DOCUMENTS

DE 102009036511 A1 2/2011
EP 2813679 A1 12/2014
(Continued)

OTHER PUBLICATIONS

Extended European Search Report received for European Patent Application No. EP14835032.5, dated Jun. 6, 2017, 8 pages.
(Continued)

*Primary Examiner* — Tom P Duong
(74) *Attorney, Agent, or Firm* — Ziegler IP Law Group, LLC

(57) ABSTRACT

An apparatus for aftertreatment of exhaust gas includes a housing an exhaust inlet, a first flow guide to guide at least part of exhaust gas to a first direction to form a first direction flow, and a reactant inlet for dispensing reactant to the first direction flow in an inner cavity to mix with the exhaust gas to provide a mixed exhaust gas. A second flow guide guides at least a part of the first direction flow to a second direction to form a second direction flow opposite to the first direction, and guide the second direction flow to a third direction to form a third direction flow downstream to the second direction and parallel to the first direction. An exhaust outlet exits output exhaust gas from the inner cavity; mixing of the reactant and the exhaust gas occurring within the first, second and third direction flow.

17 Claims, 4 Drawing Sheets

(51) Int. Cl.
  *B01F 5/00* (2006.01)
  *B01F 5/04* (2006.01)
  *B01F 3/04* (2006.01)
  *B01D 53/94* (2006.01)

(52) U.S. Cl.
  CPC ...... *B01F 3/04021* (2013.01); *B01F 3/04049* (2013.01); *B01F 5/0065* (2013.01); *B01F 5/0451* (2013.01); *B01F 5/0648* (2013.01); *B01F 5/0659* (2013.01); *F01N 3/2892* (2013.01); *B01F 2005/0022* (2013.01); *B01F 2005/0091* (2013.01); *F01N 2240/20* (2013.01); *F01N 2470/24* (2013.01); *F01N 2610/03* (2013.01)

(58) Field of Classification Search
  USPC .......................................... 422/168, 169, 177
  See application file for complete search history.

(56) References Cited

U.S. PATENT DOCUMENTS

| | | | | |
|---|---|---|---|---|
| 7,748,212 | B2* | 7/2010 | Sedlacek | F01N 13/08 60/274 |
| 9,328,640 | B2* | 5/2016 | Iverson | F01N 3/025 |
| 2003/0079467 | A1* | 5/2003 | Liu | B01F 3/04049 60/286 |
| 2006/0153748 | A1 | 7/2006 | Huthwohl et al. | |
| 2008/0041036 | A1 | 2/2008 | Witte-Merl | |
| 2008/0066451 | A1 | 3/2008 | Warner et al. | |
| 2009/0064669 | A1 | 3/2009 | Mabuchi et al. | |
| 2010/0139258 | A1 | 6/2010 | Hackett et al. | |
| 2010/0199645 | A1* | 8/2010 | Telford | B01F 3/04049 60/295 |
| 2011/0308234 | A1* | 12/2011 | De Rudder | B01F 3/04049 60/295 |
| 2014/0334988 | A1* | 11/2014 | Stanavich | B01D 53/9431 422/177 |

FOREIGN PATENT DOCUMENTS

| | | |
|---|---|---|
| EP | 2843306 A1 | 3/2015 |
| WO | 2004113690 A1 | 12/2004 |
| WO | 2010078052 A1 | 7/2010 |

OTHER PUBLICATIONS

International Search Report for Application No. PCT/FI2014/050052, dated May 2, 2014, 6 pages.

Written Opinion of the International Search Authority for International Application No. PCT/FI2014/050052, dated May 2, 2014, 7 pages.

\* cited by examiner

METHOD, APPARATUS AND SYSTEM FOR AFTERTREATMENT OF EXHAUST GAS

TECHNICAL FIELD

The present application generally relates to a system, method and apparatus for aftertreatment of exhaust gas.

BACKGROUND ART

Emission regulations for internal combustion engines have tightened over recent years, and the trend is even tightening. For example, regulated emissions of NOx and particles from internal combustion engines, are becoming so low that the target emissions levels are hard to be met. Therefore, aftertreatment systems are used in engines to reduce emissions. For reducing NOx emissions, NOx reduction catalysts, including selective catalytic reduction (SCR) systems, are utilized to convert NOx (NO and NO2) to N2 and other compounds, SCR systems utilize a reactant, such as ammonia, to reduce the NOx.

Simultaneously with the emission regulation demands, also power and efficiency demands for engines increase. On top of that the internal combustion engines should be designed and manufactured with smaller size and decreased weight, if possible.

A solution is needed for cost-efficiently providing an aftertreatment system of exhaust gas for internal combustion engine to reduce emissions capable of fulfilling the requirements for emission regulations without sacrificing too much power and efficiency of the engine and do all this in compact size.

SUMMARY

According to a first example aspect of the invention there is provided an apparatus for aftertreatment of exhaust gas comprising:
  a housing configured to define an inner cavity;
  an exhaust inlet arranged to the housing for entering exhaust gas to the inner cavity;
  a first flow guide in the inner cavity configured to guide at least part of the exhaust gas to a first direction to form a first direction flow;
  a reactant inlet arranged to the housing for dispensing reactant to the first direction flow in the inner cavity, the reactant configured to mix with the exhaust gas;
  a second flow guide in the inner cavity located downstream from the first flow guide, the second flow guide configured to:
    guide at least a part of the first direction flow to a second direction to form a second direction flow, wherein the second direction being opposite to the first direction; and
    guide the second direction flow to a third direction to form a third direction flow, wherein the third direction being downstream to the second direction and parallel to the first direction; and
  an exhaust outlet arranged to the housing for exiting output exhaust gas from the inner cavity, the exhaust outlet being downstream to the second flow guide,
  wherein mixing of the reactant and the exhaust gas occurring within the first direction flow, the second direction flow and the third direction flow.

In an embodiment, a first flow guide in the inner cavity configured to form, using the exhaust gas, a center flow and an edge flow circulating and advancing around the center flow in a first direction;
  a reactant inlet arranged to the housing for dispensing reactant to the center flow in the inner cavity, the reactant configured to mix with the exhaust gas;
  the second flow guide configured to guide at least a part of the first direction center flow and the edge flow to a second direction to form a second direction flow, wherein the second direction being opposite to the first direction; and
  wherein mixing of the reactant and the exhaust gas occurring within the first direction center flow, the second direction flow and the third direction flow.

In an embodiment, the first flow guide comprising at least one of the following:
  an inner surface of the housing configured to define the inner cavity;
  an elongated blade extending across the inner cavity; and
  a perforated tubular element, wherein at least part of the exhaust gas is configured to enter an interior of the perforated tubular element through apertures, and the perforated tubular element being configured to guide the exhaust gas to circulating and advancing movement in a first direction.

In an embodiment, the center flow advancing inside the perforated tubular element in the first direction and the edge flow circulating and advancing around the perforated tubular element in the first direction.

In an embodiment, the perforated tubular element is conical.

In an embodiment, the reactant inlet is configured to dispense a reactant into the interior of the perforated tubular element to the first direction from a first end of the perforated tubular element towards a second end of the perforated tubular element.

In an embodiment, the second flow guide comprising a cup-shaped element.

In an embodiment, an end-plate of the cup-shaped element is flat.

In an embodiment, an end-plate of the cup-shaped element is concave.

In an embodiment, the apparatus further comprising:
  a solid tubular element downstream to the perforated tubular element and upstream to the second flow guide, configured to guide at least part of the first direction flow towards the second flow guide, wherein a diameter of the solid tubular element being greater than a diameter of a second end of the perforated tubular element and allowing a part of the circulating and advancing edge flow around the perforated tubular element to enter the solid tubular element.

In an embodiment, the solid tubular element downstream to the perforated tubular element and upstream to the second flow guide is configured to guide at least part of the center flow and the edge flow towards the second flow guide.

In an embodiment, the cup-shaped element comprises a circular open end.

In an embodiment, a diameter of the circular open end being greater than a diameter of a solid tubular element downstream to the perforated tubular element and upstream to the cup-shaped element, the solid tubular element configured to guide at least part of the first direction flow towards the cup-shaped element, wherein a diameter of the solid tubular element being greater than a diameter of a second end of the perforated tubular element and allowing a part of the circulating and advancing edge flow around the perforated tubular element to enter the solid tubular element.

In an embodiment, the open end is shaped to bend inwards.

In an embodiment, the apparatus further comprising at least one of the following between the exhaust inlet and the first flow guide:
   a diesel oxidation catalyst (DOC) substrate; and
   a diesel particulate filter (DPF).

In an embodiment, the apparatus further comprising at least one of the following between the second flow guide and the exhaust outlet:
   a selective catalytic reduction (SCR) substrate; and
   a diesel particulate filter (DPF).

In an embodiment, the third direction flow is directed to the output exhaust gas.

In an embodiment, the first direction flow comprises a center flow and an edge flow circulating and advancing around the center flow in a first direction.

According to a second example aspect of the invention there is provided a method for aftertreatment of exhaust gas comprising:
   receiving exhaust gas to an inner cavity of an apparatus housing via an exhaust inlet;
   guiding at least part of the exhaust gas to a first direction to form a first direction flow in the inner cavity by a first flow guide;
   dispensing reactant to the first direction flow in the inner cavity via a reactant inlet;
   mixing the reactant with the exhaust gas;
   guiding at least a part of the first direction flow to a second direction to form a second direction flow by a second flow guide in the inner cavity, downstream from the first flow guide, wherein the second direction being opposite to the first direction;
   guiding the second direction flow to a third direction to form a third direction flow by the second flow guide, wherein the third direction being downstream to the movement in the second direction and parallel to the first direction; and
   exiting output exhaust gas from the inner cavity via an exhaust outlet, the exhaust outlet being downstream to the second flow guide, wherein
   mixing of the reactant and the exhaust gas occurring within the first direction flow, the second direction flow and the third direction flow.

According to a third example aspect of the invention there is provided an engine system comprising an apparatus for aftertreatment of exhaust gas of the first aspect.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
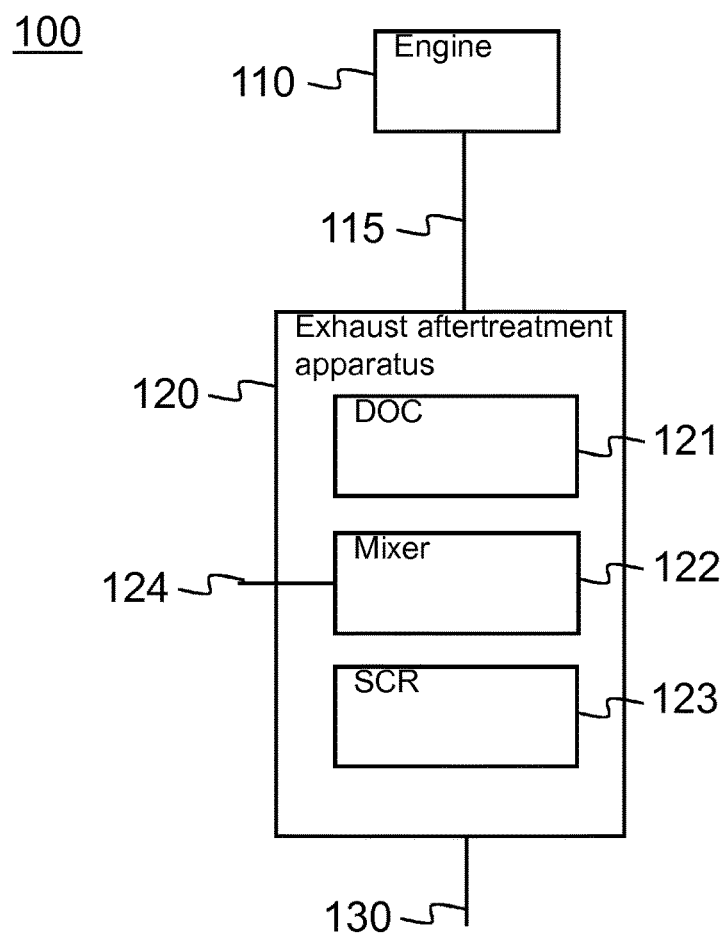
FIG. 1 shows a schematic picture of a system according to an example embodiment of the invention.

FIG. 1 shows a schematic picture of a system according to an example embodiment of the invention. An engine system 100 is shown. The engine system 100 comprises an engine 110 and an exhaust aftertreatment apparatus 120. Furthermore, the system 100 may comprise other devices that are not shown in the FIG. 1. Such devices comprise, for example, a fuel storage for the engine 110 (e.g. diesel), and an air intake device including an air filter.

FIG. 1 shows a connection 115 between the engine 110 and the exhaust aftertreatment apparatus 120. The connection 115 may comprise a pipe for guiding exhaust gas from the engine 110, for example.

The exhaust aftertreatment apparatus 120 that receives the exhaust gas from the engine 110 over the connection 115. In an embodiment, the apparatus 120 comprises a catalytic converter, such as diesel oxidation catalyst (DOC) device 121, a mixer 122 and a selective catalytic reduction (SCR) device 123. The devices 121-123 are in an embodiment implemented within the same housing of the apparatus 120 but at least one of the devices 121, 123 may also be placed outside the housing of the apparatus 120. A connection 124 for receiving reactant for the mixer 122 is also disclosed. The apparatus 120 may further comprise devices not shown in FIG. 1, such as doser for the reactant, a storage for the reactant (such as urea or ammonia), gas flow guides and connections within the apparatus 120.

Catalytic converters (diesel oxidation catalysts or DOC's) 121 are typically used in an exhaust system to convert undesirable gases such as carbon monoxide and hydrocarbons from engine's exhaust into carbon dioxide and water. DOC's may have different configurations. The substrates used in catalytic converters preferably include a catalyst.

A diesel particulate filter (DPF) may also be implemented together or alternatively to the DOC 121 in an exhaust system to remove particulate matter (e.g., carbon based particulate matter such as soot) from the exhaust. DPF's can have a variety of known configurations.

The selective catalytic reduction (SCR) catalyst device 123 is typically used in an exhaust system to remove undesirable gases such as nitrogen oxides (NOx) from the engine's emissions. SCR's are capable of converting NOx to nitrogen and oxygen in an oxygen rich environment with the assistance of reactants such as urea or ammonia, which are injected into the exhaust gas upstream of the SCR device 123.

A mixer 122 is configured to receive exhaust gas from the engine 110 over connection 115, which gas is possibly run through a DOC 121 or DPF, as disclosed above. The mixer 122 receives also reactant, such as diesel exhaust fluid (DEF), over the connection 124, the reactant commonly referred to as AdBlue that is an aqueous urea solution made with 32.5% high-purity urea and 67.5% deionized water. DEF may be used as a consumable in selective catalytic reduction (SCR) in order to lower NOx concentration in the diesel exhaust emissions from diesel engines. The mixer 122 is configured to mix the exhaust gas and the reactant and also to reduce urea deposits in exhaust pipelines. When SCR process uses DEF, it can cause urea deposits in exhaust pipes, especially in off-road applications using airless DEF injectors. Larger DEF spray droplets might lead to wall wetting and film formation on exhaust pipe inner surfaces, causing deposits when the local temperatures are low. Urea deposit problems have become frequent and critical, and the mixer 122 is configured to keep pipelines clean by evenly distributing the reactant to the exhaust gas in the shortest possible pipe length and avoiding this way the wall wetting and film formation.

The apparatus 120 may also help water evaporation from DEF and ensures optimal reactions with the reactant with no unwanted side effects. The apparatus 120 may be used with all reactant dosers (e.g. urea or ammonia) to achieve even NH3 distribution within the exhaust gas. Further benefit is experienced with airless injectors, which have rather large Sauter mean diameter (SMD) and when the injection must start at low temperatures. An exhaust gas outlet pipe 130 guides the aftertreated exhaust gas from the apparatus 120.

In an embodiment, the apparatus 120 is configured to inject small droplets of reactant, such as urea-water solution, to the exhaust gas flow and causing the reactant to vaporize in an exhaust gas flow channel defined by inner cavity of the apparatus housing and to react with the nitric oxides of the exhaust gas and changing them to plain nitrogen. Such final change to nitrogen takes place in SCR catalysator 123.

Figure 2:
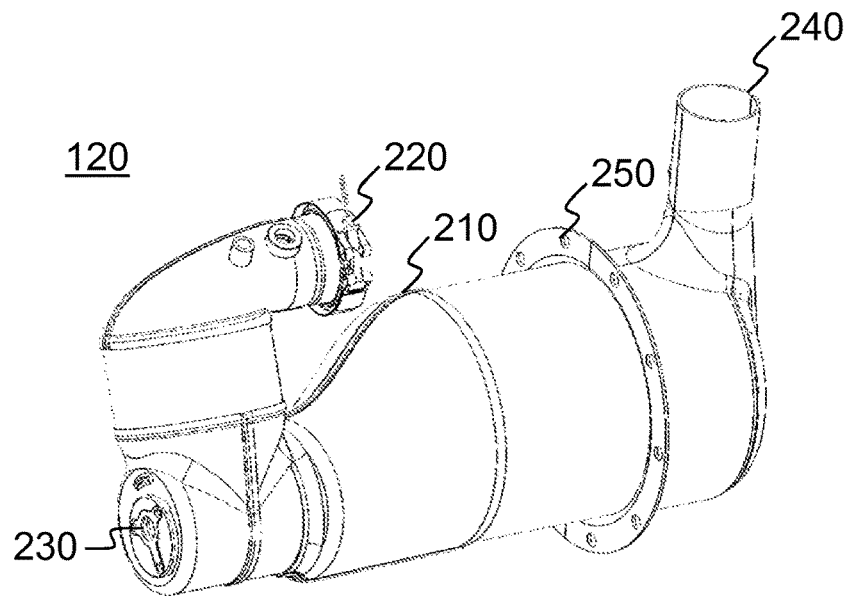
FIG. 2 shows a schematic picture of an apparatus according to an example embodiment of the invention.

FIG. 2 shows a schematic picture of an exhaust gas aftertreatment apparatus 120 according to an example embodiment of the invention. The apparatus 120 for aftertreatment of exhaust gas comprises a housing 210, an exhaust inlet 220, a reactant inlet 230, and an exhaust outlet 240.

In an embodiment, the reactant inlet comprises a nozzle 230.

The exhaust inlet 220 is arranged to the housing 210 for entering input exhaust gas to the apparatus 120. The reactant inlet 230 is arranged to the housing 210 for dispensing reactant to the apparatus 120, and the reactant is configured to mix with the input exhaust gas to provide mixed exhaust gas. The exhaust outlet 240 is arranged to the housing 210 for exiting output exhaust gas from the apparatus 120. Furthermore, the apparatus 120 may comprise, for example, attachment elements 250 for attaching the apparatus 120 to an engine system or a chassis of a vehicle. The exhaust outlet 240 may comprise an outlet duct.

Figure 3:
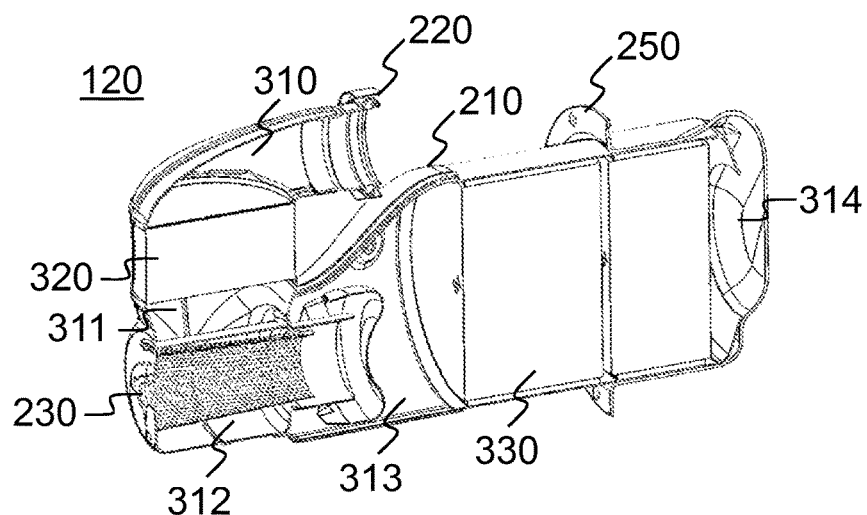
FIG. 3 shows a schematic picture of an interior of an exhaust gas aftertreatment apparatus according to an example embodiment of the invention.

FIG. 3 shows a schematic picture of an interior of an exhaust gas aftertreatment apparatus 120 according to an example embodiment of the invention. The apparatus 120 for aftertreatment of exhaust gas comprises a housing 210, an exhaust inlet 220, and a reactant inlet 230. Furthermore, the apparatus 120 may comprise, for example, attachment elements 250 for attaching the apparatus 120 to an engine system or a chassis of a vehicle.

In an embodiment, the apparatus for aftertreatment of exhaust gas 120 comprises a housing 210 that is configured to define an inner cavity 310-314. An exhaust inlet 220 is arranged to the housing 210 for entering input exhaust gas to the inner cavity 310-314. A reactant inlet 230 is arranged to the housing 210 for dispensing reactant to the inner cavity 311-314, the reactant configured to mix with the input exhaust gas to provide mixed exhaust gas. The exhaust inlet 220 may comprise an inlet duct.

In an embodiment, a diesel oxidation catalyst (DOC) substrate 320 is placed downstream to the exhaust inlet 220 and upstream to the reactant inlet 230.

In an embodiment, a selective catalytic reduction (SCR) substrate 330 is placed downstream to the reactant inlet 230 and upstream to the exhaust gas outlet (not shown in FIG. 3).

In an embodiment, the SCR substrate 330 may also comprise a diesel particulate filter (DPF) for particulate matter reduction.

Figure 4:
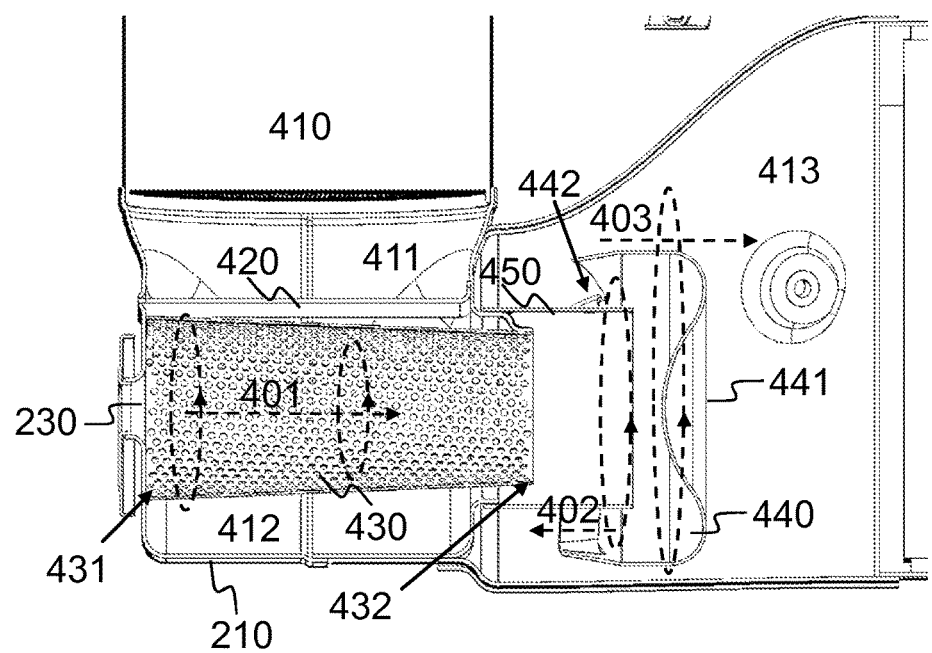
FIG. 4 shows a schematic picture of selected elements of an exhaust gas aftertreatment apparatus according to an example embodiment of the invention.

FIG. 4 shows a schematic picture of selected elements of an exhaust gas aftertreatment apparatus according to an example embodiment of the invention.

A housing 210 is configured to define an inner cavity 410-413, wherein the exhaust gas is aftertreated by the apparatus. An exhaust inlet (not shown in FIG. 4) is arranged to the housing 210 for entering input exhaust gas to the inner cavity 410-413. The exhaust gas may travel through DOC substrate within the inner cavity 410 before reaching a first flow guide 420.

In an embodiment, the first flow guide 420 may comprise an elongated blade extending across the inner cavity 411. The blade 420 may also extend only partially across the inner cavity 411.

A reactant inlet 230 is arranged to the housing 210 for dispensing reactant to the inner cavity 411-413, wherein the reactant is configured to mix with the input exhaust gas to provide mixed exhaust gas.

In an embodiment, the first flow guide 420 in the inner cavity 411 is configured to assist the exhaust gas to circulating and advancing movement in a first direction 401 within the inner cavity 412. The reactant is configured to mix with the exhaust gas when circulating and advancing.

In an embodiment, the apparatus further comprises a perforated tubular element 430, wherein at least part of the input exhaust is configured to enter an interior of the perforated tubular element through apertures. The perforated tubular element 430 is configured to assist the exhaust gas to circulating and advancing movement in a first direction 401 within the inner cavity 412. The reactant is configured to mix with the input exhaust gas when circulating and advancing. The circulating and advancing movement of the mixed exhaust gas may take place both inside the perforated tubular element 430 and outside the perforated tubular element 430 in the first direction 401.

In an embodiment, the perforated tubular element comprises a tubular feeding element 430.

In an embodiment, the perforated tubular element may have different shapes, such as cylindrical or conical. As can be seen, the perforated tubular element of FIG. 4 is conical.

In an embodiment, a second flow guide 440 is located in the inner cavity 413 downstream from the first flow guide 420. The second flow guide 440 is configured to guide at least a part of the mixed exhaust gas to circulating and advancing movement in a second direction 402, wherein the second direction 402 is opposite to the first direction 401. At least part of the exhaust gas may be directed to the second direction of 402 and the definition of opposite in this embodiment may be understood as essentially opposite, such as more than 135 degrees to opposite direction, for example.

Furthermore, due to the second flow guide 440 extending a distance to the second direction 402, the second flow guide 440 guides the second direction 402 mixed exhaust gas to circulating and advancing movement in a third direction 403, wherein the third direction 403 being downstream to the movement in the second direction 402 and parallel to the first direction 401. At least part of the exhaust gas may be directed to the third direction of 403 and the definition of parallel in this embodiment may be understood as essentially parallel, such as less than 45 degrees to parallel direction, for example.

By guiding the circulating and advancing gas flow to advance first to the first direction, and then turned to the second direction and eventually to the third direction, the time for the reactant to mix with the exhaust gas is increased. Furthermore the length of the apparatus may be reduced and thus ease the attachment to an engine system. Since the time for the reactant to mix with the exhaust gas is increased, and such operation is arranged with the first and the second flow guides and possibly with the perforated and solid tubular elements, hitting of the reactant to the surface of the housing may be reduced and vaporization of the reactant is thus improved.

In an embodiment, the second flow guide 440 is a cup-shaped element, as shown in FIG. 4. The cup-shaped element 440 is located downstream to a solid tubular element 450 and assists in guiding the circulating and advancing mixed exhaust gas of the first direction 401 to the second direction 402 and furthermore to the third direction 403.

In an embodiment, the solid tubular element 450 corresponds to a connection pipe between housing parts defining inner cavities.

In an embodiment, an end-plate 441 of the cup-shaped element 440 is flat or concave. As shown in FIG. 4, the end-plate 441 is concave and directing inwards in the middle of the end-plate 441. The concave shape of the end-plate ease the turning of the direction of the gas flow from the first direction to the second direction. Also the circulating component of the gas flow eases the turning of the flow. Thus the counter pressure caused by the turning is reduced.

In an embodiment, the cup-shaped element 440 may comprise a circular open end 442, wherein a diameter of the circular open end 442 is greater that the diameter of the solid tubular element 450. Through the gap between the open end 442 and the solid tubular element 450, the mixed exhaust gas circulating and advancing to the second direction 402 may be guided.

In an embodiment, the open end 442 of the cup-shaped element 440 may be shaped to bend inwards, towards the solid tubular element 450 as shown in FIG. 4.

In an embodiment, the open end 442 of the cup-shaped element 440 may be shaped to bend outwards, away from the solid tubular element 450, not shown in FIG. 4.

The exhaust gas thus is configured to travel first to the first direction 401, then turning back to the second direction 402 and after that to the third direction 403.

An exhaust outlet (not shown in FIG. 4) is arranged to the housing 210 for exiting output exhaust gas from the inner cavity 413, wherein the exiting output exhaust gas comprising the mixed exhaust gas circulating and advancing in the third direction.

In an embodiment, the reactant inlet 230 is configured to dispense a reactant into the interior of the perforated tubular element 430 to the first direction 401 from a first end 431 of the perforated tubular element towards a second end 432 of the perforated tubular element 430.

In an embodiment, the first end 431 of the perforated tubular element 430 may be attached to the inside surface of the housing 210. Alternatively, the first end 431 may be separated from the inside surface of the housing 210 with a small gap, through which some exhaust gas may be passed to the interior of the perforated tubular element 430 from an open first end 431 of the element 430.

In an embodiment, a solid tubular element 450 is located downstream to the perforated tubular element 430 and configured to guide the circulating and advancing mixed exhaust gas in the first direction 401 towards the second flow guide 440. A diameter of the solid tubular element 450 is greater than a diameter of a second end 432 of the perforated tubular element 430 and allows a part of the externally circulating and advancing mixed exhaust gas around the perforated tubular element 430 to enter the solid tubular element 450.

In an embodiment, an exhaust gas cleaning unit is arrangeable to an exhaust gas channel, which unit comprises an inlet duct 220, 310 for the inflow of exhaust gas to be cleaned and an outlet duct for the outflow of exhaust gas. Between the inlet duct 220, 310 and the outlet duct 240 is a first housing part 410-412 that comprises a DOC-substrate 320 (Diesel Oxidation Catalyst) and a second housing part 313, 413 that comprises a SCR catalysator 330. The housing parts may also comprise other devices for cleaning exhaust gas, such as a particle filter, (Diesel Particulate Filter). The first and the second housing part may be connected by a connection pipe 450. Inside the first housing part there is a swirl structure comprising a tubular feeding element 430 and flow guides arranged around the tubular feeding element. In a wall of the first housing there is a nozzle hole for a nozzle 230 that is used for injecting urea-water solution to the exhaust gas flowing in the tubular feeding element. With the help of the swirl structure, the exhaust gas passed through the DOC-substrate is divided to a central flow flowing inside the tubular feeding element and an edge flow surrounding the tubular feeding element. These flows are guided out from a first housing part to the connection pipe, wherein the flows are combined to an advancing exhaust gas flow that circulates around the central axis of the connection pipe.

Inside the second housing part 413 there are a first pipe 450 and a second pipe 440. The second pipe 440 comprises a first end and a second end. The first end is closed by an end-plate 441. The end-plate may be solid or comprise small apertures enabling passing through of exhaust gas flow. The first pipe comprises an end 432 that opens to the interior of the second pipe within a distance from the end-plate, and another end that opens to outside of the second housing part. A portion of the first pipe that extends outside of the second housing part forms the connecting pipe between the first and the second housing parts.

In an embodiment, the exhaust gas is guided to flow through the inlet duct to the first housing part, wherein the exhaust gas flows through DOC-substrate. After this the exhaust gas is divided to a central flow and an edge flow circulating and advancing around the central flow. Simultaneously, urea-water solution is injected through the nozzle to the central flow. The central and the edge flow are guided out of the first housing part to the connection pipe 450 and the first pipe 450 that continues from the connection pipe, wherein the flows are combined. To the combined gas exhaust flow a strong rotating flow component is formed. When the exhaust gas flow enters to the space between the first end of the first pipe and the end-plate, the gas is guided to the gap between the first and the second pipes. At the same time the direction of the exhaust gas flow is changed 180 degrees. When the exhaust gas flow exists from the second pipe via the second end, the gas enters to the space defined by the conical part 413 of the second housing part. In this space the exhaust gas turns to flow towards the SCR catalysator. Inside the second housing part the exhaust gas flows through the SCR substrate to the same direction as in the first pipe. Cleaned exhaust gas exists from the housing part via the outlet duct.

In an embodiment, the exhaust gas is guided first to the first pipe, from where it is guided to turn to flow to the gap between the first and the second pipes. The exhaust gas is arranged to a circulating and advancing flow using a swirl structure that locates upstream to the first pipe. The exhaust gas flow thus has a rotating component when it advances through the first pipe. Between the first end of the first pipe and the end-plate the direction of the exhaust gas flow is changed 180 degrees. Changing the exhaust gas flow direction the length of the exhaust gas flow path may be increased inside the second housing part and thus the water-urea solution has more time to mix with the exhaust gas flow and evaporate. The rotating component of the flow and the shape of the end-plate ease the changing of the flow direction and reduce counter pressure caused by the turning.

The size, especially length, of the exhaust gas aftertreatment apparatus may be decreased by utilizing the different directions of the exhaust gas flow within the apparatus. Furthermore, the counter pressure caused by the different gas flow directions is minimal. Reactant is better mixed with the exhaust gas with the described apparatus and vaporized more quickly. Thus, the amount of deposit generated to the inner wall of the exhaust gas channel is reduced.

In an embodiment, a perforated tubular element 430 reduces turbulence of an exhaust gas entering the interior of the perforated tubular element 430. The exhaust gas entering the interior of the perforated tubular element 430 forms a center flow, wherein the reactive substance is fed. Reducing the turbulence in the interior of the perforated tubular element 430 results in that the center flow and the edge flow remain apart from each other in the beginning of a mixing procedure, whereby the reactive substance fed into the center flow does not come into contact with a wall of the inner cavity 410-413 before it is converted to ammonia, for example.

The perforated tubular element 430 reduces formation of solid deposit generated in the conversion process of urea (or some other reactant) in the inner cavity 410-413 and thus reduces the service need of the apparatus and the engine system. Furthermore, the engine system retains its operational ability and efficiency better.

In an embodiment, not only the size of the mixing apparatus may be reduced but also the shape may be more freely designed. Since the deposit risk of the urea also in the bends of the housing 210 is reduced, the designing of the aftertreatment apparatus 120 becomes easier.

In an embodiment, a first flow guide 210, 420, 430 in the inner cavity 410-413 configured to guide at least part of the exhaust gas to a first direction 401 to form a first direction flow. A reactant inlet 230 is arranged to the housing 210 for dispensing reactant to the first direction 401 flow in the inner cavity 410-413, the reactant configured to mix with the exhaust gas to provide a mixed exhaust gas. A second flow guide 440 in the inner cavity 410-413 located downstream from the first flow guide 210, 420, 430, and the second flow guide 440 is configured to: guide at least a part of the first direction flow to a second direction to form a second direction flow, wherein the second direction 402 being opposite to the first direction 401 and guide the second direction flow to a third direction 403 to form a third direction flow, wherein the third direction being downstream to the second direction and parallel to the first direction. An exhaust outlet (not shown) is arranged to the housing 210 for exiting output exhaust gas from the inner cavity 410-413, the exhaust outlet being downstream to the second flow guide, and the output exhaust gas comprising the third direction flow, wherein mixing of the reactant and the exhaust gas occurring within the first direction flow, the second direction flow and the third direction flow.

In an embodiment, a first flow guide 210, 420, 430 in the inner cavity 410-413 is configured to form, using the exhaust gas, a center flow and an edge flow circulating and advancing around the center flow in a first direction; a reactant inlet 230 is arranged to the housing 210 for dispensing reactant to the center flow in the inner cavity, and the reactant is configured to mix with the exhaust gas to provide a mixed exhaust gas. The second flow guide 440 is configured to guide at least a part of the first direction center flow and the edge flow to a second direction to form a second direction flow, wherein the second direction being opposite to the first direction; and wherein mixing of the reactant and the exhaust gas occurring within the first direction center flow, the second direction flow and the third direction flow.

In an embodiment, a first flow guide comprises at least one of the following: an inner surface of the housing 210 configured to define the inner cavity 410-413; an elongated blade 420 extending across the inner cavity 410-412; and a perforated tubular element 430, wherein at least part of the input exhaust is configured to enter an interior of the perforated tubular element through apertures.

The elongated blade 420 may be formed and placed in such a way to the inner cavity 410-413 that it causes the exhaust gas to flow a first direction.

The inner surface of the housing 210 configured to define the inner cavity 410-413 may be formed in such a way that it causes the exhaust gas to flow in a first direction.

The perforated tubular element 430 may be formed and placed in such a way that it causes the exhaust gas to flow in a first direction.

Furthermore, a combination of any of the inner surface of the housing 210 configured to define the inner cavity 410-413; the elongated blade 420 extending across the inner cavity 410-412; and the perforated tubular element 430 may be used to guide the exhaust flow to a first direction.

In an embodiment, at least two of the following: the inner surface of the housing 210 configured to define the inner cavity 410-413; the elongated blade 420 extending across the inner cavity 410-412; and the perforated tubular element 430 may be integrated to form a first flow guide.

Some of the advantages provided by embodiments of the invention comprise at least one of the following. First, a length of a mixing flow channel is increased without increasing the size of the apparatus too much. Second, the mixing flow channel diameter may be increased. Third, there is no dedicated reactant (e.g. ammonia or urea) concentration point within the inner cavity or flow channel that would increase risk of urea deposits in exhaust pipelines. Fourth, since the second flow guide 440 is placed in the middle of the inner cavity, the temperature of it is higher than the wall surface temperature of the housing 210. When the second flow guide 440 is configured to guide at least a part of the first direction center flow and the edge flow to a second direction to form a second direction flow, wherein the amount of reactant hitting the lower temperature housing wall is reduced and thus deposit is reduced as well.

Figure 5:
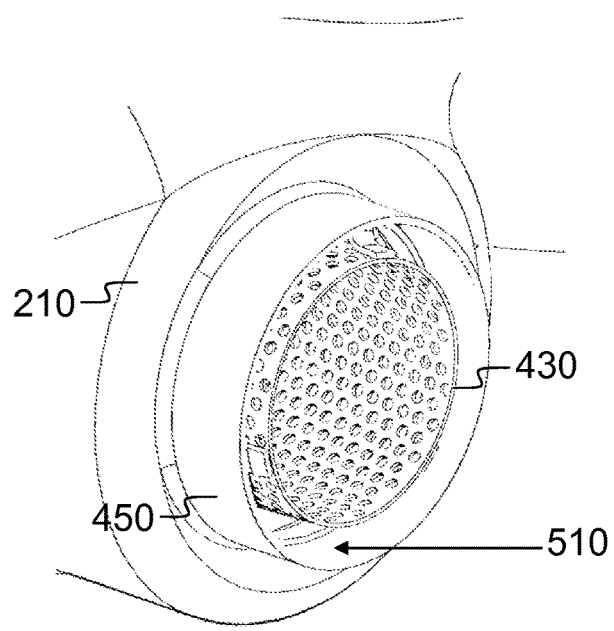
FIG. 5 shows a schematic picture of selected internal elements of an exhaust gas aftertreatment apparatus according to an example embodiment of the invention.

FIG. 5 shows a schematic picture of selected internal elements of an exhaust gas aftertreatment apparatus according to an example embodiment of the invention.

FIG. 5 illustrates the elements from the direction view of the second flow guide, such as the cup-like element.

A housing 210 of the exhaust gas aftertreatment apparatus is partially shown in FIG. 5. A solid tubular element 450 and a perforated tubular element 430 are attached to the housing and guide gas flow in the inner cavity defined by the housing as shown in earlier FIGS. 3-4. An exhaust gas flow comprises a center flow advancing inside the perforated tubular element 430 and an edge flow advancing through a gap 510 between the perforated tubular element 430 and the solid tubular element 450.

Figure 6:
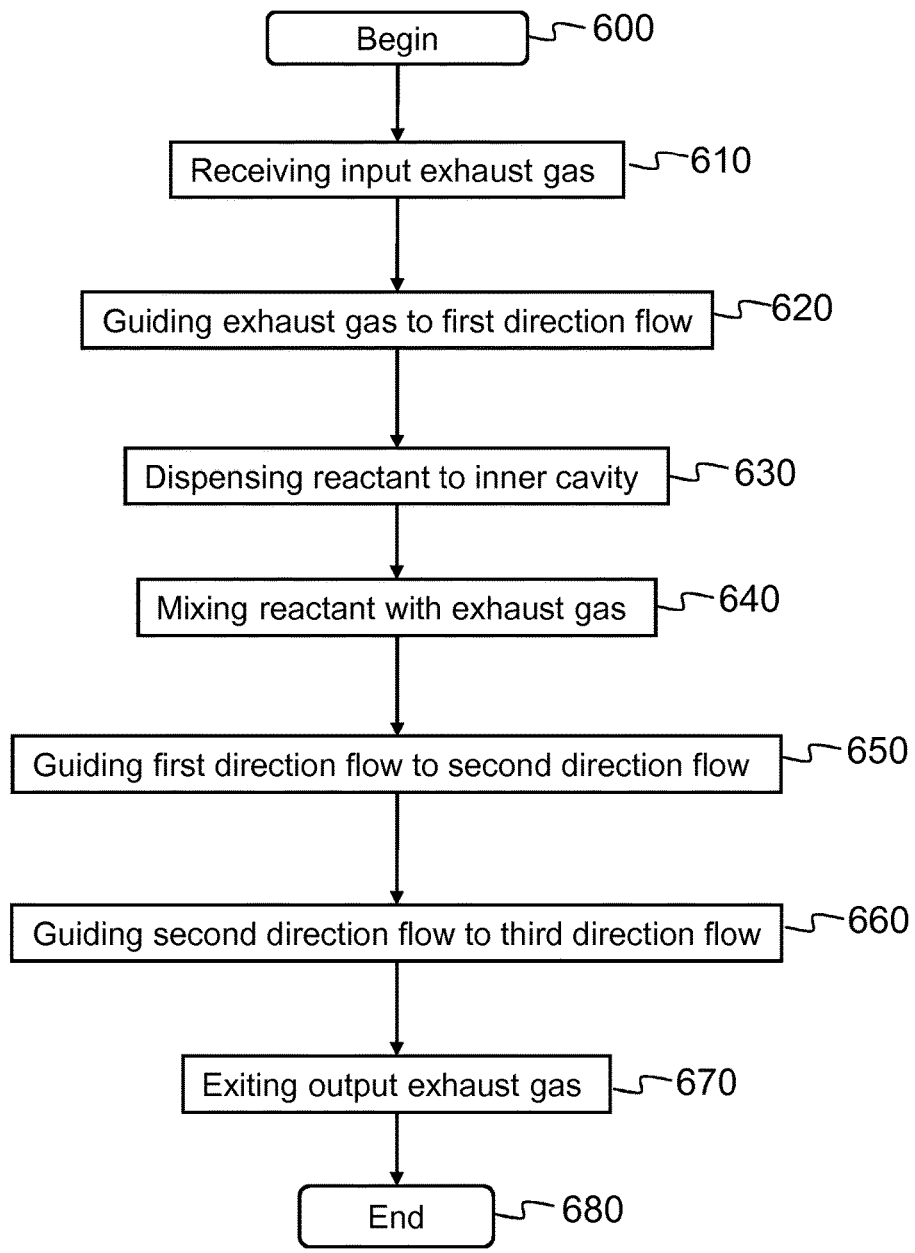
FIG. 6 shows a flow diagram showing operations in accordance with an example embodiment of the invention.

FIG. 6 shows a flow diagram showing operations in accordance with an example embodiment of the invention. In step 600, the method for aftertreatment of exhaust gas is started. In step 610, input exhaust gas is received to an inner cavity of an apparatus housing via an exhaust inlet. In step 620, at least part of the exhaust gas is guided to a first direction to form a first direction flow in the inner cavity by a first flow guide. In step 630, reactant is dispended to the first direction flow in the inner cavity via a reactant inlet. In step 640, the reactant is mixed with the exhaust gas to provide mixed exhaust gas. In step 650, at least a part of the first direction flow is guided to a second direction to form a second direction flow by a second flow guide in the inner cavity, downstream from the first flow guide, wherein the second direction being opposite to the first direction. In step 660, the second direction flow is guided to a third direction to form a third direction flow by the second flow guide, wherein the third direction being downstream to the movement in the second direction and parallel to the first direction. In step 670, output exhaust gas is exited from the inner cavity via an exhaust outlet, wherein the exiting output exhaust gas comprising the third direction flow. The reactant and the exhaust gas mixing is occurring within the first direction flow, the second direction flow and the third direction flow. The method is ended in step 680.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus for aftertreatment of exhaust gas comprising:
a housing configured to define an inner cavity;
an exhaust inlet arranged to the housing for entering exhaust gas to the inner cavity;
a first flow guide in the inner cavity configured to guide at least part of the exhaust gas to a first direction to form a first direction flow, the first flow guide comprising:
an elongated blade extending across the inner cavity; and
a perforated tubular element, wherein at least part of the exhaust gas is configured to enter an interior of the perforated tubular element through apertures, the perforated tubular element being configured to guide the exhaust gas to a circulating and advancing movement in a first direction,
the first flow guide in the inner cavity is configured to form, using the exhaust gas, a center flow and an edge flow circulating and advancing around the center flow in the first direction;
a reactant inlet arranged to the housing for dispensing reactant to the first direction flow in the inner cavity, the reactant configured to mix with the exhaust gas, wherein mixing of the reactant and the exhaust gas occurs within center flow in the first direction flow, the second direction flow and the third direction flow, and the center flow is advancing inside the perforated tubular element in the first direction and the edge flow is circulating and advancing around the perforated tubular element in the first direction;
a second flow guide in the inner cavity located downstream from the first flow guide, the second flow guide configured to:
guide at least a part of the first direction flow to a second direction to form a second direction flow, wherein the second direction being opposite to the first direction; and
guide the second direction flow to a third direction to form a third direction flow, wherein the third direction being downstream to the second direction and parallel to the first direction; and
an exhaust outlet arranged to the housing for exiting output exhaust gas from the inner cavity, the exhaust outlet being downstream to the second flow guide,
wherein mixing of the reactant and the exhaust gas occurs within the first direction flow, the second direction flow and the third direction flow;
a solid tubular element downstream to the perforated tubular element and upstream to the second flow guide, configured to guide at least part of the first direction flow towards the second flow guide, wherein a diameter of the solid tubular element being greater than a diameter of a second end of the perforated tubular element and allowing a part of the circulating and advancing edge flow around the perforated tubular element to enter the solid tubular element.

2. The apparatus of claim 1, wherein the first flow guide comprises at least one of the following:
an inner surface of the housing configured to define the inner cavity.

3. The apparatus of claim 1, wherein the perforated tubular element is conical.

4. The apparatus of claim 1, wherein the reactant inlet is configured to dispense a reactant into the interior of the perforated tubular element to the first direction from a first end of the perforated tubular element towards a second end of the perforated tubular element.

5. The apparatus of claim 1, wherein the second flow guide comprises a cup-shaped element.

6. The apparatus of claim 5, wherein an end-plate of the cup-shaped element is flat.

7. The apparatus of claim 5, wherein an end-plate of the cup-shaped element is concave.

8. The apparatus of claim 5, wherein the cup-shaped element comprises a circular open end.

9. The apparatus of claim 8, wherein the open end is shaped to bend inwards.

10. The apparatus of claim 1, wherein the solid tubular element downstream to the perforated tubular element and upstream to the second flow guide, is configured to guide at least part of the center flow and the edge flow towards the second flow guide.

11. The apparatus of claim 1, wherein the second flow guide comprises a cup-shaped element, the cup-shaped element comprises a circular open end, a diameter of the circular open end being greater than a diameter of a solid tubular element downstream to the perforated tubular element and upstream to the cup-shaped element, the solid tubular element configured to guide at least part of the first direction flow towards the cup-shaped element, wherein a diameter of the solid tubular element being greater than a diameter of a second end of the perforated tubular element and allowing a part of the circulating and advancing edge flow around the perforated tubular element to enter the solid tubular element.

12. The apparatus of claim 1, further comprising at least one of the following between the exhaust inlet and the first flow guide:
 a diesel oxidation catalyst (DOC) substrate; and
 a diesel particulate filter (DPF).

13. The apparatus of claim 1, further comprising at least one of the following between the second flow guide and the exhaust outlet:
 a selective catalytic reduction (SCR) substrate; and
 a diesel particulate filter (DPF).

14. The apparatus of claim 1, wherein the third direction flow is directed to the output exhaust gas.

15. The apparatus of claim 1, wherein the first direction flow comprising a center flow and an edge flow circulating and advancing around the center flow in a first direction.

16. A method for aftertreatment of exhaust gas comprising:
 receiving exhaust gas to an inner cavity of an apparatus housing via an exhaust inlet;
 guiding at least part of the exhaust gas to a first direction to form a first direction flow in the inner cavity by a first flow guide, the first flow guide comprising:
  an elongated blade extending across the inner cavity; and
  a perforated tubular element, wherein at least part of the exhaust gas is configured to enter an interior of the perforated tubular element through apertures, the perforated tubular element being configured to guide the exhaust gas to a circulating and advancing movement in a first direction, the first flow guide in the inner cavity being configured to form, using the exhaust gas, a center flow and an edge flow circulating and advancing around the center flow in the first direction;
 dispensing reactant to the first direction flow in the inner cavity via a reactant inlet;
 mixing the reactant with the exhaust gas, wherein mixing of the reactant and the exhaust gas occurs within center flow in the first direction flow, the second direction flow and the third direction flow, and the center flow is advancing inside the perforated tubular element in the first direction and the edge flow is circulating and advancing around the perforated tubular element in the first direction;
 guiding at least a part of the first direction flow to a second direction to form a second direction flow by a second flow guide in the inner cavity, downstream from the first flow guide, wherein the second direction being opposite to the first direction;
 guiding the second direction flow to a third direction to form a third direction flow by the second flow guide, wherein the third direction being downstream to the movement in the second direction and parallel to the first direction; and
 exiting output exhaust gas from the inner cavity via an exhaust outlet, the exhaust outlet being downstream to the second flow guide, wherein
 mixing of the reactant and the exhaust gas occurs within the first direction flow, the second direction flow and the third direction flow; and
 guiding at least part of the first direction flow towards the second flow guide using a solid tubular element downstream to the perforated tubular element and upstream to the second flow guide, wherein a diameter of the solid tubular element is greater than a diameter of a second end of the perforated tubular element and allows a part of the circulating and advancing edge flow around the perforated tubular element to enter the solid tubular element.

17. An engine system comprising an apparatus for aftertreatment of exhaust gas of claim 1.

* * * * *